United States Patent
Schultz et al.

(10) Patent No.: US 9,678,289 B1
(45) Date of Patent: Jun. 13, 2017

(54) THERMAL MANAGEMENT OF OPTICAL COUPLING SYSTEMS

(71) Applicant: International Business Machines Corporation, Armonk, NY (US)

(72) Inventors: Mark D. Schultz, Ossining, NY (US); Shurong Tian, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 8 days.

(21) Appl. No.: 14/956,484

(22) Filed: Dec. 2, 2015

(51) Int. Cl.
*G02B 6/42* (2006.01)

(52) U.S. Cl.
CPC ......... *G02B 6/4269* (2013.01); *G02B 6/4242* (2013.01); *G02B 6/4244* (2013.01); *G02B 6/4245* (2013.01); *G02B 6/4267* (2013.01)

(58) Field of Classification Search
None
See application file for complete search history.

(56) References Cited

U.S. PATENT DOCUMENTS

| | | | |
|---|---|---|---|
| 4,557,554 A | 12/1985 | Blanc | |
| 4,773,723 A | 9/1988 | Cuda | |
| 4,826,272 A * | 5/1989 | Pimpinella | H01L 31/0203 257/432 |
| 6,217,205 B1 | 4/2001 | Ward | |
| 6,788,540 B2 | 9/2004 | Kruger et al. | |
| 7,764,504 B2 | 7/2010 | Phillips et al. | |
| 8,081,470 B2 | 12/2011 | Oki et al. | |
| 2002/0118924 A1* | 8/2002 | Murata | G02B 6/4202 385/52 |
| 2007/0114547 A1* | 5/2007 | Fujita | G02B 6/4206 257/98 |
| 2007/0126081 A1* | 6/2007 | Webster | H01L 27/14618 257/565 |
| 2008/0285303 A1* | 11/2008 | Matsui | G02B 6/4201 362/580 |
| 2009/0127577 A1* | 5/2009 | Hodono | G02B 6/4204 257/98 |
| 2009/0226130 A1* | 9/2009 | Doany | G02B 6/4201 385/14 |
| 2012/0127665 A1 | 5/2012 | Prete et al. | |

(Continued)

FOREIGN PATENT DOCUMENTS

KR 1020050045145 A 5/2005

*Primary Examiner* — Jerry Rahll
(74) *Attorney, Agent, or Firm* — Steven F. McDaniel

(57) ABSTRACT

An optical coupling system includes a substrate, an electronic die comprising a plurality of coupling holes for passing light, an optical element die attached to a bottom surface of the electronic die, the electronic die attached to the substrate such that the electronic die covers a cavity in the substrate and the optical element die resides within the cavity of the substrate. The system may also include a thermally conductive lid that covers and contacts the electronic die and the substrate and has a coupling aperture that enables light that passes through the coupling holes to pass through the thermally conductive lid. The system may also include an optical cable coupler comprising a coupling section that laterally fits within the coupling aperture and a body section disposed above the coupling section that is laterally larger than the coupling section. A method for providing the above system is also disclosed herein.

20 Claims, 4 Drawing Sheets

(56) References Cited

U.S. PATENT DOCUMENTS

| | | | |
|---|---|---|---|
| 2013/0094799 A1* | 4/2013 | Mathai | G02B 6/423 385/14 |
| 2014/0086537 A1* | 3/2014 | Chan | G02B 6/421 385/89 |
| 2014/0119689 A1* | 5/2014 | Yabre | G02B 6/4206 385/14 |
| 2014/0153866 A1* | 6/2014 | Lee | G02B 6/43 385/14 |
| 2014/0270659 A1* | 9/2014 | Schunk | G02B 6/4277 385/93 |
| 2015/0078711 A1* | 3/2015 | Ootorii | G02B 6/4268 385/88 |
| 2015/0086162 A1* | 3/2015 | Miyahara | G02B 23/2423 385/33 |
| 2016/0226592 A1* | 8/2016 | Arvelo | H04B 10/40 |
| 2016/0274320 A1* | 9/2016 | Guidotti | G02B 6/4259 |
| 2016/0334594 A1* | 11/2016 | Leigh | G02B 6/43 |

* cited by examiner

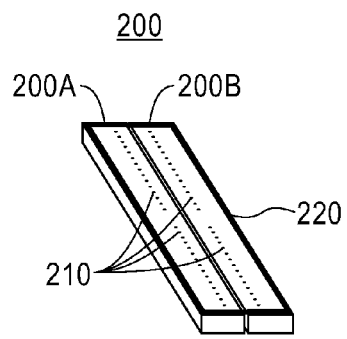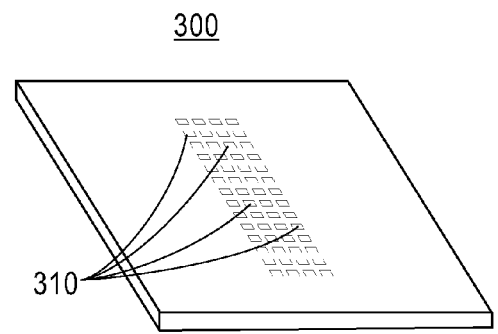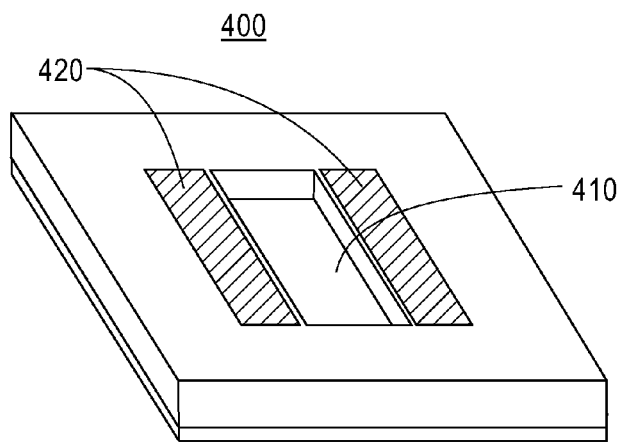

THERMAL MANAGEMENT OF OPTICAL COUPLING SYSTEMS

GOVERNMENT RIGHTS

This invention was made with government support under contract number H98230-13-D-0122 awarded by the United States Department of Defense. The United States Government has certain rights to this invention.

BACKGROUND OF THE INVENTION

The present invention relates generally to the field of optical coupling systems, and more particularly to thermal management in optical coupling systems.

Active optical elements such as electro-optic transceivers often produce substantial thermal loads and are usually optically coupled to large optical connectors which hinder access to cooling elements such as heat sinks. Furthermore, the optical coupling pathways between the active optical elements and the optical connectors comprise materials that are thermally insulating and reduce the ability to cool the active optical elements. Additionally, the continued increase in channels carried on optical fibers along with the potential for multicore fiber applications increases the need for better thermal management in optical coupling systems.

SUMMARY

As disclosed herein, an optical coupling system includes a substrate having a cavity formed on a top surface thereof, an electronic die comprising a plurality of coupling holes for passing light, an optical element die attached to a bottom surface of the electronic die, the electronic die attached to the substrate such that the electronic die covers the cavity and the optical element die resides within the cavity of the substrate. The optical element die may comprise one or more optical elements for providing light to, or receiving light from, the coupling holes. The system may also include a thermally conductive lid that covers and contacts at least a portion of the electronic die and the substrate and comprises a coupling aperture that encompasses the plurality of coupling holes and enables light that passes through the coupling holes to pass through the thermally conductive lid. The system may also include an optical cable coupler provided with a coupling section that laterally fits within the coupling aperture and a body section disposed above the coupling section that is laterally larger than the coupling aperture.

One method corresponding to the above system includes: providing a substrate having a cavity formed on a top surface thereof, providing an electronic die comprising a plurality of coupling holes for passing light, connecting an optical element die to a bottom surface of the electronic die, attaching the electronic die and the optical element die to the substrate such that the electronic die covers the cavity and the optical element die resides within the cavity of the substrate. The optical element die may include one or more optical elements for providing light to, or receiving light from, the coupling holes. The method may also include covering the electronic die and the optical element die with a thermally conductive lid that covers and contacts at least a portion of the electronic die and the substrate. The thermally conductive lid may include a coupling aperture that encompasses the plurality of coupling holes and enables light that passes through the coupling holes to pass through the thermally conductive lid. The method may also include optically coupling an optical cable coupler to the one or more optical elements, the optical cable coupler provided with coupling section that laterally fits within the coupling aperture and a body section disposed above the coupling section that is laterally larger than the coupling aperture.

BRIEF DESCRIPTION OF THE DRAWINGS

FIG. 2 is a perspective view drawing depicting one example of an optical element die in accordance with at least one embodiment of the present invention;

FIG. 3 is a perspective view drawing depicting one example of an electronic die in accordance with at least one embodiment of the present invention;

FIG. 4 is a perspective view drawing depicting one example of a substrate in accordance with at least one embodiment of the present invention;

DETAILED DESCRIPTION

The embodiments disclosed herein recognize that the optical coupling pathways in optical coupling systems are thermally insulating and reduce the ability to cool active elements (e.g., driving circuits and electro-optic transceivers) that produce substantial thermal loads. Furthermore, the embodiments disclosed herein recognize that reducing the coupling area in such systems can improve the ability to cool the active elements that produce substantial thermal loads. The embodiments disclosed herein also recognize that long and/or narrow thermal paths within optical coupling systems reduce the ability to cool the active elements that produce substantial thermal loads and that short and/or broad thermally conductive paths can improve the ability to cool the active elements that produce substantial thermal loads.

Figure 1:
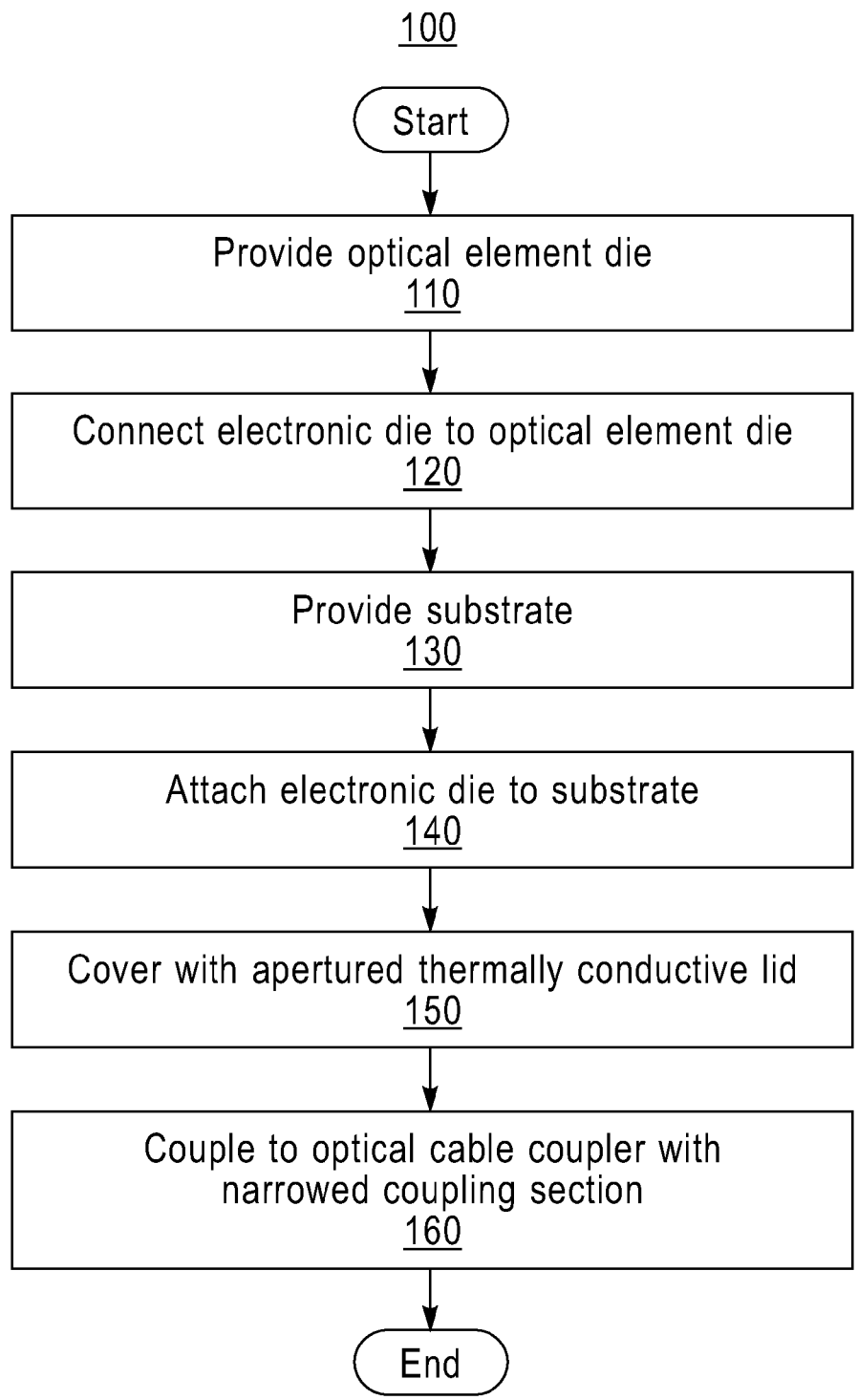
FIG. 1 is a flowchart diagram depicting one example of an electro-optic packaging method in accordance with at least one embodiment of the present invention.

Various embodiments will now be described in reference to the Figures. For example, FIG. 1 is a flowchart diagram depicting one example of an electro-optic packaging method 100 in accordance with at least one embodiment of the present invention. As depicted, the electro-optic packaging method 100 includes providing (110) one or more optical element die, connecting (120) to an electronic die, providing (130) a substrate, attaching (140) the electronic die to the substrate, covering (150) with an apertured thermally conductive lid, and coupling (160) to an optical cable coupler. The electro-optic packaging method 100 enables forming an optical coupling system with improved thermal cooling characteristics.

Providing (110) one or more optical element die includes providing one or more die with one or more optical elements thereon such as optical transmitters, receivers, or transceivers. The optical elements may be electro-optic elements that convert an electronic signal to an optical signal and/or an optical signal to an electronic signal.

One example of a set of optical element die is depicted in the perspective view drawing of FIG. 2 as optical die 200. As depicted, optical die 200 include a transmitting die 200A, a receiving die 200B, optical elements 210 and thermal solder pad(s) 220. The optical die 200 contain optical elements 210 that enable transmitting and/or receiving optical signals such as data modulated laser beams. In some embodiments, the optical die 200 comprises a semiconductor material such as GaAs.

The thermal solder pad 220 provides an external thermal pathway for heat dissipation. In the depicted embodiment, the thermal solder pad is disposed on the perimeter of the optical die 200 and (substantially completely) encompasses the optical elements 210. In addition to thermal solder pads, the optical die may contain electronic solder pads (not shown) that provide an external pathway for electrical power and electrical signals such as transmit signals and receive signals. The thermal solder pad 220 and the electronic solder pads may be used to thermally, electrically, and physically attach the optical element die to an electronic die or substrate.

Referring again to FIG. 1, connecting (120) an electronic die may include physically, electrically, and thermally connecting an electronic die to the optical element die. The electronic die may have one or more electronic circuits thereon such as receiving circuits and/or driving circuits. The electronic circuits may be electrically or otherwise operably connected with optical (including electro-optical) elements on the optical element die. The electronic die may also have one or more coupling holes for passing light provided by, or received by, the optical elements on the optical element die. The coupling holes may enable optical elements on the optical element die to optically couple to external elements such as fiber optic cables.

One example of an electronic die that can be connected with an optical element die is depicted in FIG. 3. As depicted, the electronic die 300 includes one or more coupling holes 310 for passing light. In some embodiments, the electronic die comprises a semiconductor material that is conducive to forming circuits thereon such as driving (e.g., transmitting) circuits and receiving circuits. Consequently, the electronic die 300 may have one or more electronic circuits formed thereon such as driving circuits and receiving circuits (not explicitly shown in FIG. 3). The various circuits may be operably connected to optical elements (including electro-optical elements) on one or more optical die 200 attached to the electronic die 300.

Referring again to FIG. 1, providing (130) a substrate may include providing a substrate with a cavity formed therein that is sufficiently large enough to contain the optical element die. One example of such a substrate is depicted in FIG. 4 as substrate 400. As depicted, substrate 400 is provided with a cavity 410 and connection areas 420. The cavity 410 may be sufficiently large enough to contain the optical die 200. The connection areas 420 may be sized and placed to contact the undersurface of the electronic die 300 without overlapping with the optical die 200 that is attached (e.g., soldered) to the undersurface of the electronic die 300. In some embodiments, the substrate 400 is also provided with connection areas 420 on the bottom surface to facilitate connection with a system board, a motherboard, or the like.

The connection areas 420 may be formed of a material of high thermal and electrical conductivity. In some embodiments, the connections areas are patterned (not shown) with signal traces and pads that support the transfer of electrical signals (e.g., to/from the electronic die 300) and thermal interface pads that support the transfer of thermal energy. The thermal interface pads of the connection areas 420 may conform to irregularities in the surfaces that they contact in order to maximize heat transfer. For example, the thermal interface pads of the connection areas 420 may be formed of a pad material, a gel, or a paste. In some embodiments, the thermal interface pads of the connection areas 420 are formed of a cured material.

Figure 5:
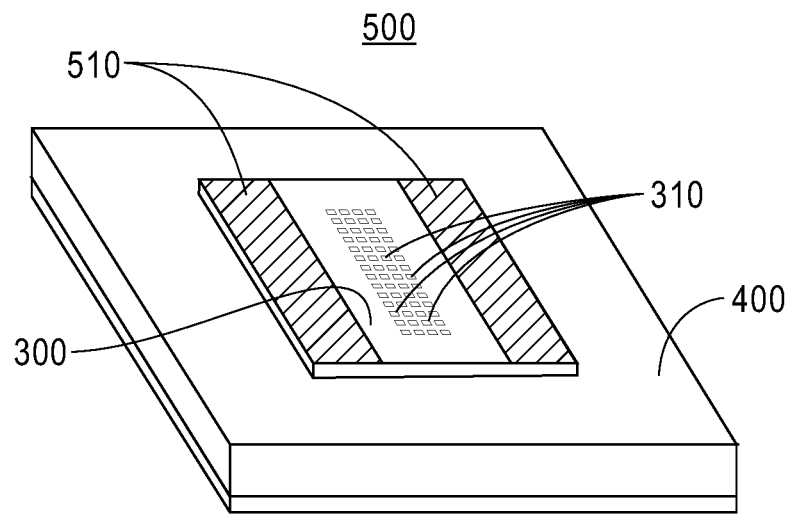
FIG. 5 is a perspective view drawing depicting one example of an electro-optic device in accordance with at least one embodiment of the present invention.

Attaching (140) the electronic die to the substrate may include physically and thermally attaching the electronic die to the substrate in a manner that places the optical element die within the cavity of the substrate. One example of an electronic die that is attached to a substrate having such a cavity is depicted in FIG. 5 as the electro-optic device 500. As depicted, the electro-optic device 500 includes the substrate 400 with the electronic die 300 placed over the cavity 410 (not shown in FIG. 5) such that the optical die 200 (not shown in FIG. 5) that is attached to the electronic die 300, fits within the cavity 410. A thermal interface layer 510 and the connection areas 420 (not seen in FIG. 5, see FIG. 7) may improve the thermal conductivity between the electronic die 300 and the other elements of the the electro-optic device 500.

Covering (150) with an apertured thermally conductive lid may include covering the electronic die with a thermally conductive lid that has an aperture that is just sufficiently large enough to encompass the coupling holes so that light that passes through the coupling holes will not be blocked (e.g., give manufacturing and coupling tolerances). Furthermore, the contact area between the thermally conductive lid and the electronic die may be substantially maximized.

Figure 6:
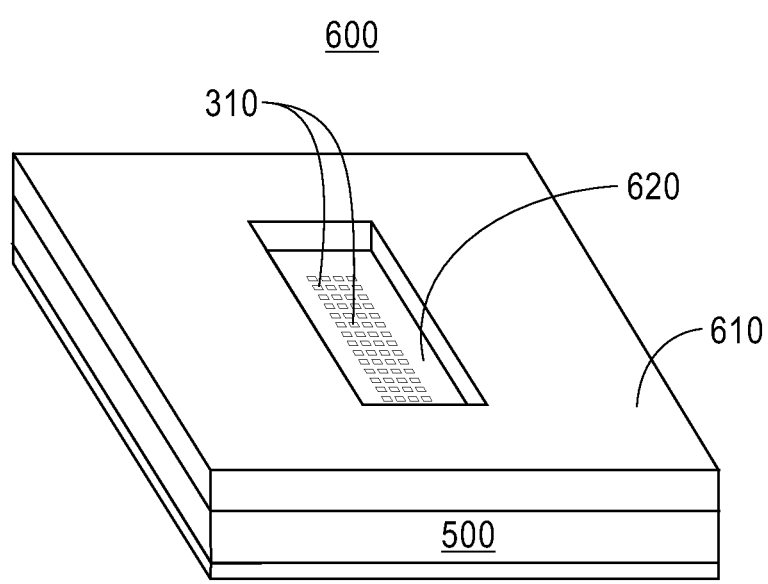
FIG. 6 is a perspective view drawing depicting one example of a lidded electro-optic device in accordance with at least one embodiment of the present invention.

The thermally conductive lid may be formed of a material of high thermal conductivity (e.g., >180 W/m K) such as aluminum, copper or diamond. In some embodiments, the thermally conductive lid is a heat sink that incorporates air cooling or water cooling elements. In other embodiments, the thermally conductive lid is in thermal communication with (e.g., in contact with) a heat sink. One example of an electronic die covered with a thermally conductive lid is depicted in FIG. 6 as a lidded electro-optic device 600. As depicted, the lidded electro-optic device 600 includes the electo-optic device 500 covered with a thermal lid 610 that has an aperture 620 formed therein that enables light to pass through the coupling holes 310.

Referring again to FIG. 1, coupling (160) to an optical cable coupler may include coupling to an optical cable coupler that has a coupling section that is sufficiently narrow to fit within the aperture of the apertured thermally conductive lid. One example of such an optical cable coupler is depicted in the cross sectional view of FIG. 7 which depicts an optical coupling system 700.

Figure 7:
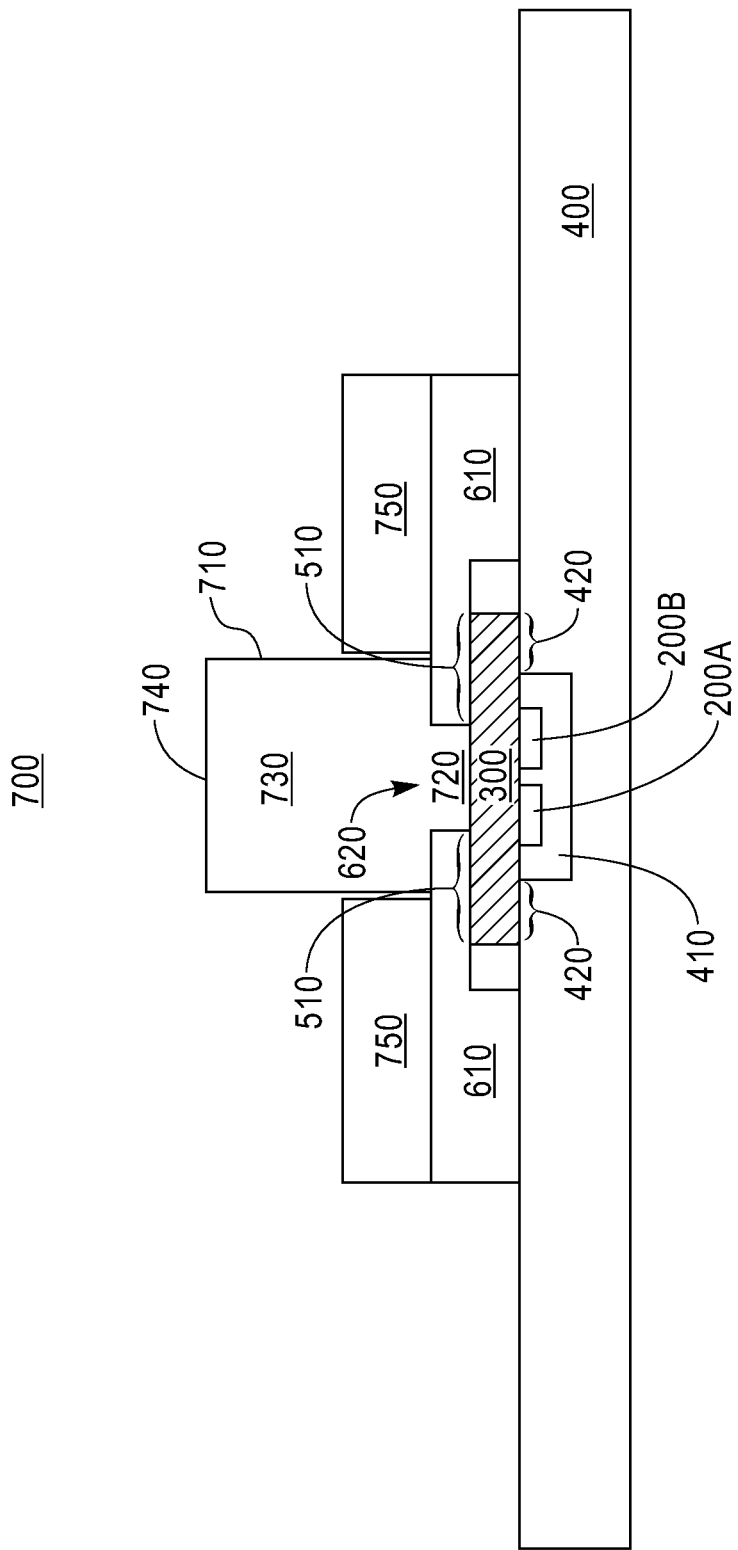
FIG. 7 is a cross-sectional view depicting one example of an optical coupling system in accordance with at least one embodiment of the present invention.

As depicted in FIG. 7, the optical coupling system 700 includes substrate 400 with cavity 410 formed therein that contains the optical die 200A and 200B. The optical die 200A and 200B are attached to the backside of the electronic die 300. The thermally conductive lid 610 covers and contacts at least a portion of the electronic die 300 and the substrate 400. The thermally conductive lid 610 includes a coupling aperture 620 that encompasses the coupling holes 310 (see FIG. 3) and enables light that passes through the coupling holes 310 to pass through the thermally conductive lid 610. An optical cable coupler 710 includes a coupling section 720 that fits laterally within the coupling aperture 620, a body section 730 disposed above the coupling section that is laterally larger than the coupling aperture, and a heat sink 750 that provides cooling capabilities to the lid 610 and potentially the optical cable coupler 710 as well. In some embodiments, the heat sink 750 is thermally attached to the thermally conductive lid and opposing sidewalls of the body section of the optical cable coupler 710.

The optical cable coupler 710 may also include various mechanical elements (not shown) which enable connecting the optical cable coupler 710 to an optical cable (not shown) and thereby enable optical coupling between the optical elements on the optical die 200 and the optical cable. The various mechanical elements may hold a coupling surface (not shown) of the optical cable adjacent to, and in contact with, a coupling surface 740 of the body section 730. Index matching fluids may also be used to fill in gaps between coupling surfaces and improve optical coupling.

In some embodiments, the optical coupling system 700 includes one or more lensing elements (not shown) disposed between optical elements on the optical die 200 and the coupling section 720 of the optical cable coupler 710. The lensing elements may reduce the divergence of, or focus, light beams that pass through the coupling holes 310. In some embodiments, the lensing elements are disposed within, or adjacent to, the coupling holes 310.

One of skill in the art may appreciate that the narrowed coupling section 720 of the optical coupler 710 relative to the body section 730 and coupling surface 740 provides for an increased contact area with the electronic die 300 and an improved thermal path through the thermally conductive lid 610 to the heatsink 750. The increased contact area may significantly improve the thermal performance of the optical coupling system 700 relative to conventional coupling systems that do not have a narrowed coupling section 720 along with a narrowed coupling aperture 620. In some embodiments, the diameter of the narrowed coupling section 720 is less than 80 percent of the width of the body section 730. In certain embodiments, the diameter of the narrowed coupling section 720 is less than 60 percent of the width of the body section 730.

The embodiments disclosed herein also recognize that, due to laser divergence, the optical cable coupler 710 must be close to the coupling holes 310 (not shown in FIG. 7) on the electronic die 300. The embodiments disclosed herein also recognize that the potentially high heat loads from the active elements on the optical element die 200 and the electronic die 300 require short and broad thermal pathways (e.g., as provided by the thermally conductive lid 610) to cooling elements such as the heat sink 750. Providing short and broad thermal pathways enables the optical coupling system 700 to maintain reasonable operating temperatures for optical elements on the optical element die 200 (e.g., VCSEL lasers) and electronic circuits on the electronic die 300 such as driving circuits and receiving circuits.

It should be noted that this description is not intended to limit the invention. On the contrary, the embodiments presented are intended to cover some of the alternatives, modifications, and equivalents, which are included in the spirit and scope of the invention as defined by the appended claims. Further, in the detailed description of the disclosed embodiments, numerous specific details are set forth in order to provide a comprehensive understanding of the claimed invention. However, one skilled in the art would understand that various embodiments may be practiced without such specific details.

Although the features and elements of the embodiments disclosed herein are described in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. An optical coupling system comprising:
   a substrate having a cavity formed on a top surface thereof;
   an electronic die comprising a plurality of coupling holes for passing light;
   an optical element die attached to a bottom surface of the electronic die;
   the electronic die attached to the substrate such that the electronic die at least partially covers the cavity and the optical element die resides within the cavity of the substrate, the optical element die comprising one or more optical elements for providing light to, or receiving light from, the coupling holes;
   a thermally conductive lid that covers and contacts at least a portion of the electronic die and the substrate, the thermally conductive lid comprising a coupling aperture that encompasses the plurality of coupling holes and enables light that passes through the coupling holes to pass through the thermally conductive lid; and
   an optical cable coupler comprising a coupling section and a body section, the coupling section laterally fitting within the coupling aperture and the body section disposed above the coupling section and laterally larger than the coupling aperture.

2. The system of claim 1, further comprising a heat sink thermally attached to the thermally conductive lid.

3. The system of claim 2, further comprising a thermal interface material disposed between the heat sink and the thermally conductive lid.

4. The system of claim 1, wherein the thermally conductive lid is a heat sink.

5. The system of claim 1, wherein the thermally conductive lid comprises air cooling elements or water cooling elements.

6. The system of claim 1, wherein the electronic die comprises a driving circuit.

7. The system of claim 6, wherein the driving circuit is electrically connected with an electro-optical element on the optical element die.

8. The system of claim 1, further comprising a lensing element.

9. The system of claim 8, wherein the lensing element reduces divergence of a light beam that passes through a coupling hole.

10. The system of claim 1, further comprising a thermal interface layer comprising a thermal interface material.

11. The system of claim 10, wherein the thermal interface layer is disposed between the electronic die and the thermally conductive lid.

12. The system of claim 10, wherein the thermal interface layer is disposed between the electronic die and the substrate.

13. The system of claim 10, wherein the thermal interface layer is disposed between the thermally conductive lid and the substrate.

14. The system of claim 10, wherein the thermal interface layer is disposed between the electronic die and the optical element die.

15. The system of claim 10, wherein the thermal interface layer is a pad.

16. The system of claim 10, wherein the thermal interface material is a gel.

17. The system of claim 10, wherein the thermal interface material is cured.

18. The system of claim 1, wherein the one or more optical elements comprise a laser.

19. The system of claim 1, wherein the one or more optical elements comprise a photodiode.

20. An optical coupling method comprising:

providing a substrate having a cavity formed on a top surface thereof;

providing an electronic die comprising a plurality of coupling holes for passing light;

connecting an optical element die to a bottom surface of the electronic die;

attaching the electronic die and the optical element die to the substrate such that the electronic die covers the cavity and the optical element die resides within the cavity of the substrate, the optical element die comprising one or more optical elements for providing light to, or receiving light from, the coupling holes;

covering the electronic die and the optical element die with a thermally conductive lid that covers and contacts at least a portion of the electronic die and the substrate, the thermally conductive lid comprising a coupling aperture that encompasses the plurality of coupling holes and enables light that passes through the coupling holes to pass through the thermally conductive lid; and optically coupling an optical cable coupler to the one or more optical elements, the optical cable coupler comprising a coupling section that laterally fits within the coupling aperture and a body section disposed above the coupling section that is laterally larger than the coupling aperture.

* * * * *